(12) United States Patent
Benighaus et al.

(10) Patent No.: US 12,195,644 B2
(45) Date of Patent: Jan. 14, 2025

(54) FREEZE PROTECTED WATER-BASED DISPERSION ADHESIVE AND USE THEREOF

(71) Applicant: SIKA TECHNOLOGY AG, Baar (CH)

(72) Inventors: Tobias Benighaus, Münster (DE); Bernd Overkamp, Horstmar (DE); Wilfried Carl, Kreuzlingen (CH); Al Duhamel, Fall River, MA (US); Michael Scuderi, Norwood, MA (US)

(73) Assignee: SIKA TECHNOLOGY AG, Baar (CH)

( * ) Notice: Subject to any disclaimer, the term of this patent is extended or adjusted under 35 U.S.C. 154(b) by 372 days.

(21) Appl. No.: 17/528,741

(22) Filed: Nov. 17, 2021

(65) Prior Publication Data
US 2022/0154052 A1  May 19, 2022

(30) Foreign Application Priority Data
Nov. 17, 2020 (EP) .................... 20208179

(51) Int. Cl.
*C09J 7/30* (2018.01)
*B32B 37/12* (2006.01)
*C09J 11/04* (2006.01)
*C09J 11/06* (2006.01)
*C09J 133/08* (2006.01)
*E04D 5/14* (2006.01)

(52) U.S. Cl.
CPC ......... *C09J 133/08* (2013.01); *B32B 37/1284* (2013.01); *C09J 7/30* (2018.01); *C09J 11/04* (2013.01); *C09J 11/06* (2013.01); *E04D 5/148* (2013.01); *B32B 2255/26* (2013.01); *B32B 2419/06* (2013.01); *C09J 2400/16* (2013.01); *C09J 2433/00* (2013.01)

(58) Field of Classification Search
CPC ... C09J 133/08; C09J 7/30; C09J 11/06; C09J 2400/16; C09J 2433/00; C09J 133/04; C04B 2103/0065; C04B 2111/00482; C04B 2111/0637; C04B 2111/00801; C04B 28/04; C04B 28/06; C04B 28/145; C04B 40/065; C08K 3/10; C08K 5/05
USPC .................................................. 524/5
See application file for complete search history.

(56) References Cited

U.S. PATENT DOCUMENTS

| | | | | |
|---|---|---|---|---|
| 4,088,804 A | * | 5/1978 | Cornwell | E01F 9/506 427/427 |
| 4,238,378 A | * | 12/1980 | Markusch | C08G 18/0809 528/68 |
| 2005/0014881 A1 | | 1/2005 | Weitzel et al. | |
| 2016/0333255 A1 | * | 11/2016 | Shchepelina | C09K 8/685 |
| 2021/0238095 A1 | * | 8/2021 | Onuoha | C04B 24/2641 |

FOREIGN PATENT DOCUMENTS

| | | |
|---|---|---|
| DE | 19801892 A1 | 7/1999 |
| DE | 10150600 A1 | 4/2003 |
| EP | 0490191 A2 | 6/1992 |
| EP | 0620243 A1 | 10/1994 |
| WO | 2016/097371 A1 | 6/2016 |
| WO | 2019/210965 A1 | 11/2019 |

OTHER PUBLICATIONS

May 17, 2021 European Search Report issued in European Patent Application 20208179.0.

* cited by examiner

*Primary Examiner* — Hannah J Pak
(74) *Attorney, Agent, or Firm* — Oliff PLC

(57) ABSTRACT

A two-component composition including a first component A including an aqueous dispersion of at least one polymer P, at least one metal salt M, and at least one liquid organic freeze point depressant D, and a second component B having a mineral binder composition C having at least one hydraulic binder H. The two-component composition is used as an adhesive, sealant or coating and to a method for bonding a first substrate to a second substrate.

15 Claims, No Drawings

FREEZE PROTECTED WATER-BASED DISPERSION ADHESIVE AND USE THEREOF

TECHNICAL FIELD

The invention relates to the field of water-based dispersion compositions and use thereof for bonding of substrates, particularly in the field of waterproofing.

BACKGROUND OF THE INVENTION

In the field of construction polymeric sheets, which are often referred to as membranes or panels, are used to protect underground and above ground constructions, such as basements, tunnels, and flat and low-sloped roofs, against penetration water. Waterproofing membranes are applied, for example, to prevent ingress of water through cracks that develop in the concrete structure due to building settlement, load deflection or concrete shrinkage. Roofing membranes used for waterproofing of flat and low-sloped roof structures are typically provided as single-ply or multi-ply membrane systems. In a single-ply system, the roof substrate is covered using a roofing membrane composed of single waterproofing layer, which is can be mechanically stabilized with a reinforcement layer, typically a layer of fiber material. In multi-ply systems, a roofing membrane composed of multiple layers of different or similar materials is used.

Commonly used materials for waterproofing and roofing membranes include plastics, in particular thermoplastics such as plasticized polyvinylchloride (p-PVC), thermoplastic olefins (TPE-O, TPO), and elastomers such as ethylene-propylene diene monomer rubber (EPDM). The membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may, for example, be a concrete, metal, or wood deck, or it may include an insulation board or recover board and/or an existing membrane.

The roofing membranes must be secured to the roof substrate to provide sufficient mechanical strength to resist the shearing forces applied on it, for example due to high wind loads. The roofing membrane can be mechanically fastened to the roof substrate using screws and/or barbed plates. Mechanical fastening enables high strength bonding, but it provides direct attachment to the roof substrate only at locations where a mechanical fastener affixes the membrane to the surface, which makes mechanically attached membranes susceptible to flutter. Membranes can also be secured to the roof substrate by adhesive bonding, which allows the formation of a "fully-adhered roof system". In this case the majority, if not all, of the surface of the membrane is secured to the roof substrate via an adhesive layer.

Roofing membranes can be adhesively bonded to roof substrates by using a number of techniques including contact bonding and using self-adhering membranes. In contact bonding both the membrane and the surface of the roof substrate are first coated with a solvent- or water-based contact adhesive after which the membrane is contacted with the surface of the substrate. The volatile components of the contact adhesive are "flashed off" to provide a partially dried adhesive film prior to contacting the membrane with the substrate. A fully-adhered roof system can also be prepared by using self-adhering roofing membranes having a pre-applied adhesive layer coated on one of the primary exterior surfaces of the membrane. Typically, the pre-applied adhesive layer is covered with a release liner to prevent premature unwanted adhesion and to protect the adhesive layer from moisture, fouling, and other environmental factors. At the time of use the release liner is removed and the roofing membrane is secured to the substrate without using additional adhesives. Roofing membranes having a pre-applied adhesive layer covered by release liner are also known as "peel and stick membranes".

Water-based adhesives, sealants, and coatings are in many cases preferred over solvent-based formulations due to environmental and health reasons (EHS).

However, water-based adhesives are not freeze resistant and they cannot be stored or applied at temperatures of below 0° C. Using suitable particle stabilization, "freeze-thaw stability" can be reached such that the adhesive composition can be frozen and thawed repeatedly. Nevertheless, commercially available water-based adhesives typically require a minimum application temperature of 5° C. to ensure safe application and drying. In many cases the roof substrate to be waterproofed has limited moisture absorption capacity, such as in case of a PIR insulation boards, wood panels, or gypsum cover boards. Consequently, the removal of water contained in the adhesive used for adhering a roofing membrane to a substrate is of crucial importance. Due to the slow drying behavior of water-based roofing adhesives at low temperatures, the market switches to solvent-based adhesives during the cold season since these can be applied also at sub zero temperatures.

There thus remains a need for a novel type of water-based adhesive, sealant, or coating, which is also suitable for use in outdoor applications at temperatures of below 0° C.

SUMMARY OF THE INVENTION

The object of the present invention is to provide a water-based composition, which can be applied at temperatures of below 0° C. and which composition cures to form an adhesive, sealant, or coating material.

The composition is especially suitable for use as a contact adhesive, but it may also be employed as a sealant or coating.

Another object of the present invention is to provide a method for bonding a first substrate to a second substrate using the water-based composition.

The subject of the present invention is a two-component composition as defined in claim 1.

It has been surprisingly found out that a composition comprising a water-based polymer dispersion, a metal salt, and a liquid organic freeze point depressant, and a hydraulic binder as a drying agent is suitable for use as a two-component adhesive, sealant or coating in outdoor applications at temperatures of below 0° C. Furthermore, the composition has been found out to have a suitable drying behavior even at temperatures of −10° C.

One of the advantages of the composition of the present invention is that it can be provided as a two-component storage stable formulation and that the mixing of the components can be easily conducted before application without using special apparatuses or other means.

Other subjects of the present invention are presented in other independent claims. Preferred aspects of the invention are presented in the dependent claims.

DETAILED DESCRIPTION OF THE INVENTION

The subject of the present invention is a two-component composition comprising a first component A comprising:

a1) An aqueous polymer dispersion of at least one polymer P, a2) At least one metal salt M, and a3) At least one liquid organic freeze point depressant D, and and a second component B comprising:

b1) A mineral binder composition C comprising at least one hydraulic binder H and b2) Optionally at least one cement hydration retarder R.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "elastomer" refers to any natural, synthetic, or modified high molecular weight polymer or combination of polymers, which is capable of recovering from large deformations, i.e. has elastic properties. Typical elastomers are capable of being elongated or deformed to at least 200% of their original dimension under an externally applied force, and will substantially resume the original dimensions, sustaining only small permanent set (typically no more than about 20%), after the external force is released. The term "elastomer" may be used interchangeably with the term "rubber." In particular, the term "elastomer" refers to elastomers that have not been chemically crosslinked. The term "chemically crosslinked" is understood to mean that the polymer chains forming the elastomer are inter-connected by a plurality of covalent bonds, which are mechanically and thermally stable.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography (GPC) using polystyrene as standard, styrene-divinylbenzene gel with porosity of 100 Angstrom, 1000 Angstrom and 10000 Angstrom as the column and, depending on the molecule, tetrahydrofurane as a solvent, at 35° C., or 1,2,4-trichlorobenzene as a solvent, at 160° C.

The term "peak melting temperature ($T_m$)" refers to a melting point determined as a maximum of the curve determined by means of differential scanning calorimetry (DSC) using the measurement method as defined in ISO 11357-3:2018 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the peak melting temperature ($T_m$).

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one elastomer" refers to the sum of the individual amounts of all elastomers contained in the composition. For example, in case the composition comprises 20 wt.-% of at least one elastomer, the sum of the amounts of all elastomers contained in the composition equals 20 wt.-%.

The term "normal room temperature" designates a temperature of 23° C.

The composition of the present invention is a two-component composition, wherein both components A and B are preferably prepared and stored separately and mixed just before the application of the two-component composition.

Furthermore, both components A and B are preferably storage stable, meaning that the components can be kept, particularly in the absence of moisture, in a suitable package or facility, such as a drum, a pouch or a cartridge, for example, for a period of several months up to one year or more, without suffering any service-relevant change in the application properties and/or reactivity of the composition.

The second component B is preferably in form of a powder, preferably composed of solid particles having a median particles size $d_{50}$ of not more than 200 μm, more preferably not more than 150 μm, even more preferably not more than 100 μm. The term "particle size" refers in the present document to the area-equivalent spherical diameter of a particle. The term median particle size $d_{50}$ refers to a particle size below which 50% of all particles by volume are smaller than the $d_{50}$ value. A particle size distribution can be determined by sieve analysis according to the method as described in ASTM C136/C136M-14 standard ("Standard Test Method for Sieve Analysis of Fine and Coarse Aggregates).

The two-component composition of the present invention is preferably essentially free of volatile organic solvents. The term "volatile organic solvent" refers in the present document to organic substances that are liquid at a temperature of 25° C., are able to at least partially dissolve another substance, and have a standard boiling point of not more than 225° C., preferably not more than 200° C. The term "standard boiling point" refers in the present disclosure to boiling point measured at a pressure of 1 bar. The standard boiling point of a substance or composition can be determined, for example, by using an ebulliometer.

The expression "essentially free of volatile organic solvents" is understood to mean that the amount of such solvents is negligible, such as less than 1.5 wt.-%, preferably less than 1.0 wt.-%, more preferably less than 0.5 wt.-%, even more preferably less than 0.1 wt.-%, still more preferably less than 0.01 wt.-%, based on the total weight of the two-component composition.

The first component A comprises an aqueous polymer dispersion of at least one polymer P.

The term "dispersion" refers in the present document to a physical state of matter that includes at least two distinct phases, wherein a first phase is distributed in a second phase, with the second phase being a continuous medium. Preferably, the dispersion comprises a solid phase which is dispersed as solid particles in a continuous liquid phase. Consequently, the term "polymer dispersion" refers to a composition comprising a continuous liquid phase and solid particles of one or more polymers dispersed in the liquid phase. The term "aqueous polymer dispersion" refers to a polymer dispersion having water as the main carrier. Preferably, the term "aqueous" refers to a 100% water carrier.

The aqueous polymer dispersion of at least one polymer P contained in the first component A is preferably an electrolyte stable aqueous polymer dispersion. The term "electrolyte stable" refers to dispersions that remain unaffected by the addition of substantially unlimited quantities of electrolytes. The term "electrolyte" refers to a substance that dissociates into two or more ions at least to some extent when mixed with water or other polar solvent. Examples of electrolyte stable aqueous polymer dispersions of polyurethane polymers are disclosed, for example, in patent document U.S. Pat. No. 4,238,378 A.

Preferably, the aqueous polymer dispersion of at least one polymer P comprises at least 25 wt.-%, preferably at least 35 wt.-%, more preferably at least 45 wt.-%, even more preferably at least 50 wt.-%, of the total weight of the first component A. According to one or more embodiments, the aqueous polymer dispersion of at least one polymer P comprises 35-95 wt.-%, preferably 40-85 wt.-%, more preferably 45-80 wt.-%, even more preferably 50-75 wt.-%, of the total weight of the first component A.

According to one or more embodiments, the aqueous polymer dispersion of at least one polymer P has a solids content in the range of 25-90 wt.-%, preferably 35-85 wt.-%, more preferably 40-80 wt.-%, even more preferably 40-75 wt.-%. The term "solids content" refers in the context of a polymer dispersion to the portion of the dispersion, which when heated to a temperature of 105° C. for one hour at one atmosphere pressure does not volatilize. Solids content of an aqueous polymer dispersion can be determined by using the EPA Test Method 24 ("Determination of volatile matter content, water content, density, volume solids, and weight solids of surface coatings", 2017).

According to one or more embodiments, the aqueous polymer dispersion of at least one polymer P comprises, based on the total weight of the aqueous polymer dispersion, 5-90 wt.-%, preferably 35-85 wt.-%, more preferably 40-80 wt.-%, even more preferably 40-75 wt.-%, of the at least one polymer P.

The aqueous polymer dispersion of at least one polymer P can be prepared by polymerization, such as free-radical polymerization, using substance, solution, suspension or emulsion polymerization techniques, which are all known to the person skilled in the art.

Alternatively, the aqueous polymer dispersion of at least one polymer P can be prepared by using commercially available aqueous polymer dispersions and/or re-dispersible polymer powders, which can be mixed with water and/or with aqueous polymer dispersions to obtain the aqueous polymer dispersion of at least one polymer P. Furthermore, aqueous polymer dispersions can be diluted with addition water to adjust the solids content. The term "re-dispersible polymer powder" refers to a dried residue of an aqueous polymer dispersion, said dispersion being a mixture of at least one water-insoluble film-forming polymer. Re-dispersible polymer powders are generally produced by spray-drying techniques of water-based dispersions containing, for example, polymers based on vinyl esters, such as vinyl acetate, vinyl chloride, (meth)acrylate monomers, styrene, butadiene, and ethylene. Re-dispersible polymer powders may further comprise one or more compounds selected from colloidal stabilizers and antiblocking agents. Examples of re-dispersible polymer powders and methods for producing thereof are disclosed, for example, in patent application US 2005/0014881 A1.

According to one or more embodiments, the at least one polymer P comprises 5-60 wt.-%, preferably 10-50 wt.-%, more preferably 15-45 wt.-%, even more preferably 20-40 wt.-%, still more preferably 20-35 wt.-%, of the total weight of the first component A.

Preferably, the at least one polymer P has a glass transition temperature determined by dynamical mechanical analysis (DMA) as the peak of the measured loss modulus (G") curve using an applied frequency of 1 Hz and a strain level of 0.1% of at or below 0° C., more preferably at or below −10° C., even more preferably at or below −20° C., particularly in the range of 0--60° C., preferably −10--60° C., more preferably −20--60° C. Such polymers P have been found out especially suitable for use in adhesives, sealants, and coatings that are applied at temperatures of below 0° C.

According to one or more embodiments the at least one polymer P has a number average molecular weight ($M_n$) in the range of 5000-250000 g/mol, preferably 25000-200000 g/mol, more preferably 50000-200000 g/mol and/or a weight average molecular weight ($M_w$) in the range of 50000-800000 g/mol, preferably 100000-800000 g/mol, more preferably 150000-800000 g/mol.

Suitable polymers P include, for example, acrylic polymers, polyurethane polymers, styrene copolymers, halogenated styrene copolymers, ethylene vinyl acetate copolymers, polyvinyl alcohol, polyvinyl acetate, silicones, and rubbers, such as styrene butadiene rubber, natural rubber, styrene isoprene rubber, polyisoprene, polybutadiene, polychloroprene, butyl rubber, halogenated butyl rubber, chlorinated polyethylene, chlorosulfonated polyethylene, ethylene propylene rubber, and butadiene acrylonitrile copolymers.

The term "acrylic polymer" refers in the present document to homopolymers, copolymers and higher inter-polymers of an acrylic monomer with one or more further acrylic monomers and/or with one or more other ethylenically unsaturated monomer(s). The term "acrylic monomer" refers in the present document to (meth)acrylates, (meth)acrylic acid, and to derivatives thereof, for example, amides of (meth)acrylic acid or nitriles of (meth)acrylic acid. Preferred acrylic polymers contain at least 30 wt.-%, more preferably at least 40 wt.-%, even more preferably at least 50 wt.-%, of acrylic monomers.

According to one or more embodiments, the at least one polymer P is selected from the group consisting of acrylic polymers, styrene butadiene copolymers, polyurethane polymers, and ethylene vinyl acetate copolymers. The term "polyurethane polymer" refers in the present disclosure to polymers prepared by so called diisocyanate polyaddition process, including those polymers which are almost or completely free of urethane groups. Examples of polyurethane polymers are polyether polyurethanes, polyester polyurethanes, polyether polyureas, polyureas, polyester polyureas, polyisocyanurates, and polycarbodiimides.

Suitable aqueous polymer dispersions for use in the first component A are commercially available, for example from Synthomer (UK) limited under the trade name of Lipaton®, such as Lipaton® SB 2540, Lipaton® SB 3040, and Lipaton® SB 2740 (styrene butadiene copolymers) and under the trade name of Plextol®, such as Plextol E 303 and Plextol X 4002 (pure acrylics);

from Celanese under the trade name of Mowilith®, such as Mowilith® LDM 7978 (acrylic) and Mowilith® LDM 7651 (styrene acrylic);

from BASF under the trade name of Acronal®, such as Acronal® V 278 (acrylate), Acronal® V 212 (acrylate), Acronal® 81 D (acrylate), Acronal® 4 F(acrylate), Acronal® DS 5017 (pure acrylate), and Acronal® A 107 (pure acrylate);

from Airproducts under the trade name of Airflex®, such as Airflex® EF811 (vinyl acrylic copolymer);

from Arkema under the trade name of Encor®, such as Encor® flex 187 (acrylic), Encor®123 (styrene acrylic), Encor® flex 192 (styrene acrylic), and Encor® 9176 (styrene acrylic);

from Wacker Chemie under the trade name of Vinnapas®, such as Vinnapas® EAF 60 and Vinnapas® EAF 67 (vinyl acetate/ethylene/acrylate polymer); and from Dow Chemicals under the trade name of Primal®, such as Primal® CA-162 and Primal® CA-172 (acrylic).

Suitable water re-dispersible polymer powders for preparing the aqueous dispersion of at least one polymer P are commercially available, for example from Wacker Chemie under the trade name of Vinnapas®, such as Vinnapas® 2000 series, Vinnapas®3000 series, Vinnapas® 4000 series, Vinnapas®5000 series, Vinnapas® 7000 series, and Vinnapas®8000 series; and from Synthomer under the trade name of Axilat®, such as Axilat® HP 8000 series, Axilat® UP series, Axilat® PSB 150 (styrene butadiene copolymer), and Axilat® PAV series (vinyl acetate vinyl versatate copolymer).

According to one or more embodiments, the at least one polymer P comprises at least one first polymer P1 and at least one second polymer P2 different from the at least one first polymer P1, wherein the at least one first polymer P1 and the at least one second polymer P2 are selected from the group consisting of acrylic polymers, styrene butadiene copolymers, polyurethane polymers, and ethylene vinyl acetate copolymers. Generally, the expression "the at least one component X comprises at least one component XN", such as "the at least one polymer P comprises at least one first polymer P1" is understood to mean in the context of the present disclosure that a composition comprises one or more first polymers P1 as representatives of the at least one polymer P. Aqueous polymer dispersions comprising two or more different polymers P can be prepared by using mixtures of commercially available aqueous polymer dispersions and/or re-dispersible polymers, such as those described above.

According to one or more embodiments, the aqueous polymer dispersion of at least one polymer P is an aqueous hybrid dispersion of the at least one first polymer P1 and the at least one second polymer P2. Such hybrid dispersions can be obtained by preparing a first aqueous polymer dispersion of the at least one first polymer P1 followed by polymerizing monomers of the at least one second polymer P2 in the first aqueous polymer dispersion of the at least one first polymer P1, for example, by using a core-shell emulsion polymerization techniques. In core-shell emulsion polymerization, the particles of the at least one first polymer P1 are used as seed particles and the monomers of the at least one second polymer P2 are then polymerized within the particles of the at least one first polymer P1. Other types of morphologies than core-shell, such as embedded sphere morphologies, are also suitable and can be obtained by using different techniques.

According to one or more embodiments, the at least one polymer P comprises at least one acrylic polymer PA.

Suitable acrylic polymers PA consist for the most part of (meth)acrylates of alcohols containing from 1 to 24 carbon atoms. Preferred acrylic polymers contain, as polymerized units, at least 25 wt.-%, preferably at least 35 wt.-%, more preferably at least 50 wt.-% of these types of acrylic monomers. Suitable ethylenically unsaturated monomers that can be used as comonomers with the acrylic monomers include, for example, vinyl esters and allyl esters of carboxylic acids containing from 1 to 20 carbon atoms, vinyl ethers of alcohols containing from 1 to 8 carbon atoms, vinyl aromatic compounds, particularly styrene, vinyl halides, non-aromatic hydrocarbons containing from 2 to 8 carbon atoms and at least one olefinic double bond, α and β-unsaturated mono- or di-carboxylic acids containing from 3 to 6 carbon atoms, and derivatives thereof (especially amides, esters and salts).

Examples of particularly suitable acrylic polymers PA include poly(meth)acrylates, copolymers of (meth)acrylates and styrene, copolymers of (meth)acrylates and vinyl esters of tertiary carboxylic acids, copolymers and terpolymers of (meth)acrylates, vinyl esters of tertiary carboxylic acids and vinyl acetate, and copolymers of vinyl acetate and (meth)acrylates.

According to one or more embodiments, the aqueous polymer dispersion of at least one polymer P is an aqueous acrylic polymer dispersion, wherein the at least one polymer comprises the at least one acrylic polymer PA and wherein the amount of the other polymers than acrylic polymers is less than 5.0 wt.-%, preferably less than 2.5 wt.-%, more preferably less than 1.0 wt.-%, based on the total weight of the aqueous polymer dispersion of at least one polymer P.

Suitable acrylic polymer dispersions and preparation method thereof are described, for example in EP 0490191 A2, DE 19801892 A1, and in EP 0620243 A1.

According to one or more embodiments, the at least one acrylic polymer PA comprises at least one first acrylic polymer PA1 and at least one second acrylic polymer PA2 having a different glass transition temperature ($T_g$) and/or a different monomer composition and/or a different number average molecular weight ($M_n$) than the at least one first acrylic polymer PA1.

The first component A further comprises at least one metal salt M, which is preferably present in the two-component composition as an inorganic freeze point depressant. Preferable, the at least one metal salt M is a monovalent or a divalent metal salt.

The term "monovalent metal salt" designates in the present disclosure a salt that comprises a monovalent metal cation and any anion. Monovalent metals are metal atoms, which are present in the stable oxidation state +1, such as $Na^+$, $K^+$, and $Ag^+$. In analogy, the term "divalent metal salt" designates a salt that comprises a divalent metal cation and any anion. Divalent metals are metal atoms which are present in the stable oxidation state +2, such as $Ca^{2+}$, $Mg^{2+}$, and $Sr^{2+}$.

Suitable cations for monovalent metal salts include all monovalent metal cations, especially monovalent alkali metal cations, such as monovalent sodium, potassium, and lithium cations. Suitable cations for divalent metal salts include all divalent metal cations, especially alkaline earth metal cations, such as divalent calcium and magnesium cations.

Suitable anions for the at least one metal salt M include anions of inorganic and organic acids, such as chloride, sulfate, nitrate, gluconate, and formiate anions. Halide anions may also be used, but they can in some cases be detrimental to the performance of the mixed two-component composition, in particular to the mineral binder composition C.

According to one or more embodiments, the at least one metal salt M is a monovalent metal salt, preferably having a cation selected from the group consisting of sodium, potassium, and lithium and/or an anion selected from the group consisting of chloride, formiate, and gluconate.

According to one or more embodiments, the at least one metal salt M is selected from the group consisting of sodium chloride, sodium formiate, and sodium gluconate.

Preferably, the at least one metal salt M comprises at least 0.1 wt.-%, more preferably at least 0.5 wt.-%, of the total weight of the first component A. According to one or more embodiments, the at least one metal salt M comprises 0.5-7.5 wt.-%, preferably 1-5 wt.-%, more preferably 1.5-4.5 wt.-%, even more preferably 2-4 wt.-%, of the total weight of the first component A.

The first component A further comprises at least one liquid organic freeze point depressant D.

The term "liquid" is defined in the present disclosure as a material that flows at normal room temperature, has a pour point determined according to ISO 3016:2019 standard of less than 20° C. and/or a kinematic viscosity at 25° C. of 50000 mPa·s or less.

Suitable liquid organic freeze point depressants include, for example, aliphatic monohydric, dihydric glycolic, and polyhydric alcohols, ethers of these alcohols, as well as aliphatic ketones and aliphatic esters.

Suitable monohydric alcohols include, for example, ethanol, 1-propanol, 2-propanol, 1-butanol, 2-butanol, 2-methyl-1-propanol, 2-methyl-2-propanol.

Suitable dihydric glycolic alcohols include 1,2-propylene glycol, 1,3-propylene glycol, 1,4-butylene glycol, 1,3-butylene glycol, 2,3-butylene glycol.

Suitable polyhydric alcohols include glycerol, erythritol, and pentaerythritol.

According to one or more embodiments, the at least one organic liquid freeze point depressant D is a polyhydric alcohol, preferably selected from the group consisting glycerol, erythritol, and pentaerythritol.

Preferably, the at least one organic liquid freeze point depressant D comprises at least 0.1 wt.-%, more preferably at least 0.5 wt.-%, of the total weight of the first component A. According to one or more embodiments, the at least one organic liquid freeze point depressant D comprises 0.5-7.5 wt.-%, preferably 1-5 wt.-%, more preferably 1.5-4.5 wt.-%, even more preferably 2-4 wt.-%, of the total weight of the first component A.

According to one or more embodiments, the first component A further comprises at least one inorganic filler F.

Preferably, the at least one inorganic filler F has a median particle size $d_{50}$ of not more than 100 µm, more preferably not more than 50 µm, more preferably not more than 35 µm, even more preferably not more than 25 µm. According to one or more embodiments, the at least one inorganic filler F has a median particle size $d_{50}$ in the range of 0.5-100 µm, preferably 1.0-50 µm, more preferably 2.5-35 µm, even more preferably 5-25 µm.

Preferably, the at least one inorganic filler F has a water-solubility of less than 0.1 g/100 g water, more preferably less than 0.05 g/100 g water, even more preferably less than 0.01 g/100 g water, at a temperature of 20° C. The solubility of a compound in water can be measured as the saturation concentration, where adding more compound does not increase the concentration of the solution, i.e. where the excess amount of the substance begins to precipitate. The measurement for water-solubility of a compound in water can be conducted using the standard "shake flask" method as defined in the OECD test guideline 105 (adopted 27 Jul. 1995).

The at least one inorganic filler F may be used for improving the rheological properties of an uncured composition obtained after the first A component and second component B have been mixed with each other and/or to improve the mechanical properties and the surface properties of a fully cured two-component composition.

Suitable as inorganic fillers F are, for example natural, ground or precipitated calcium carbonates, optionally coated with fatty acids or fatty acid esters, especially stearic acid, baryte, talcs, quartz flours, quartz sand, dolomites, wollastonites, kaolins, calcined kaolins, mica (potassium aluminum silicate), molecular sieves, aluminum oxides, pyrogenic silica, precipitated silica, industrially produced carbon blacks, graphite, metal powders, such as aluminum, copper, iron, silver or steel, hollow glass spheres, and ceramic microspheres.

According to one or more embodiments, the at least one inorganic filler F is selected from the group consisting of calcium carbonate, baryte, talcs, quartz flour, quartz sand, dolomite, wollastonite, kaolin, calcined kaolin, mica, molecular sieves, pyrogenic silica, precipitated silica, carbon black, and graphite.

According to one or more embodiments, the at least one inorganic filler F comprises or is composed of calcium carbonate, preferably having a median particle size $d_{50}$ in the range of 1-35 µm, more preferably 2.5-25 µm, even more preferably 5-20 µm.

According to one or more embodiments, the first component A further comprises at least one dispersing agent DA. Dispersing agents may be used to improve the storage stability of the aqueous polymer dispersion of the at least one polymer P. The use of dispersing agent DA is especially preferred in case the aqueous polymer dispersion of at least one polymer P has been obtained by mixing of re-dispersible polymer powders with water and/or with aqueous polymer dispersions.

The use of non-ionic dispersing agents may be preferred over ionic ones since some ionic dispersing agents have been found out to lose their effectiveness in the presence of the at least one metal salt M. Adding a metal salt to an aqueous polymer dispersion containing one or more ionic dispersing agents has sometimes been found out to result in destabilization of the aqueous polymer dispersion and consequently in the coagulation of the dispersed particles of the at least one polymer P.

The performance of dispersing agents is typically based on two different mechanisms: electrostatic or steric stabilization. Some dispersing agents are based on combined electrostatic and steric stabilization, also known as electrosteric stabilization.

Suitable dispersing agents include polymeric dispersing agents (high molecular weight dispersants), surfactants, and emulsifiers.

Suitable polymeric dispersing agents include, for example, alkali-soluble resins (ASR) that are a type of electrosteric emulsifiers. These are commercially available, for example, from BASF under the trade name of Joncryl HPD.

Further suitable polymeric dispersing agents include polyacrylic acid, polycarboxylic copolymer, polyacrylate, polyurethane, star-shaped polymer, and block copolymer-based dispersants. These are commercially available, for example, from BASF under the trade name of Dispex® Ultra and Efka® and from Levaco Chemicals under the trade name of Lucramul®.

Polycarboxylate salts, for example polycarboxylate alkali metal and ammonium salts and alkali metal salts of polyacrylic acid (PAA) as also suitable as dispersing agents. These are commercially available, for example, from BASF under the trade name of Dispex® AA and Dispex® CX.

Further suitable as dispersing agents include non-ionic, cationic, anionic, and amphoteric surfactants. The term "surfactant" refers here to surface tension lowering substances, which are usually organic compounds containing both hydrophobic and hydrophilic groups.

Suitable non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth) acrylic acids with polyalkylene glycols or aminopolyalkylene glycols, which at most may be tacked at one end with alkyl groups.

Suitable anionic surfactants include compounds containing carboxylate, sulfate, phosphate or sulfonate groups, such as amino acid derivatives, fatty alcohol ether sulfates, fatty alcohol sulfates, alkyl benzene sulfonates, alkylphenol ethoxylates; fatty alcohol ethoxylates, alkanesulfonates, olefinsulfonates, and alkyl phosphates.

Examples of suitable cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants include amphoteric electrolytes such as aminocarboxylic acids and betaines.

The preferred amount of the at least one dispersing agent DA depends on the type and amount of the at least one polymer P and on the type and amount of other constituents contained in the first component A. A skilled person in the field of resin and polymer dispersions is able to adjust the amount accordingly in order to obtain a stable, homogeneous first component A. Due to their molecular structure and particle size, some polymers P do not require any dispersing agents DA in order to form a stable dispersion with water.

According to one or more embodiments, the first component A further comprises at least one plasticizer PL.

The use of a plasticizer depends on the intended application of the two-component composition and on the type of the at least one polymer P. Very soft polymers with a very low glass transition temperature, such as for example of at or below −60° C., do not necessarily require the addition of a plasticizer.

The preferred type of the at least one plasticizer PL depends on the type of the at least one polymer P and further on the type of plasticizers that may be contained in the substrate that is contacted with the mixed two-component composition during application.

Suitable plasticizers PL are liquid inert organic substances having a low vapor pressure, preferably having a boiling point of above 200° C. measured at a pressure of 1 bar.

According to one or more embodiments, the at least one plasticizer PL is selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, phthalates, and esters of 1,2-dicarboxy cyclohexane.

Especially suitable fatty acid esters for use as plasticizer PL include alkyl esters of fatty acids containing more than about 14 or more than about 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

Preferably, the at least one plasticizer PL comprises at least 0.1 wt.-%, more preferably at least 0.5 wt.-%, of the total weight of the first component A. According to one or more embodiments, the at least one plasticizer PL comprises 0.5-15 wt.-%, preferably 1-10 wt.-%, more preferably 1.5-7.5 wt.-%, even more preferably 2.5-7.5 wt.-%, of the total weight of the first component A.

According to one or more embodiments, the first component A further comprises at least one coalescent agent CA. These may be added to the first component A, for example, to reduce the glass transition temperature of the at least one polymer P and/or to support the film formation at low temperatures.

According to one or more embodiments, the at least one coalescent agent CA has a boiling point measured at a pressure of 1 bar of at or above 175° C., preferably at or above 200° C., more preferably at or above 225° C.

Suitable coalescent agents DA include, for example, phenyl ethers of ethyleneglycol, monoisobutyrate of 2,2,4-trimethyl-1,3-pentanediol, butylglycol, butyldiglycol acetate, dipropylene glycol n-butyl ether, and tripropylene glycol n-butyl ether. These commercially available, for example, from Dow Chemicals under the trade name of Dowanol DPnB® and Dowanol TPnB® and from Eastman Chemical Company under the trade name of Texanol®.

According to one or more embodiments, the first component A further comprises at least one tackifying resin TR.

The term "tackifying resin" designates in the present disclosure resins that in general enhance the adhesion and/or tackiness of an adhesive composition. The term "tackiness" designates in the present disclosure the property of a substance of being sticky or adhesive by simple contact. The tackiness can be measured, for example, as a loop tack. Preferred tackifying resins are tackifying at a normal room temperature.

Examples of suitable tackifying resins to be used in the adhesive composition include natural resins, synthetic resins and chemically modified natural resins.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers to compounds obtained from the controlled chemical reactions such as polyaddition or polycondensation between well-defined reactants that do not themselves have the characteristic of resins.

Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomer or cycloaliphatic monomer include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, dicyclopentadiene, and terpenes. Aromatic monomer can include $C_8$, $C_9$, and $C_{10}$ aromatic monomer. Examples of aromatic monomer include styrene, indene, derivatives of styrene, derivatives of indene, coumarone and combinations thereof.

Particularly suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum-based feedstocks are referred in the present disclosure as "hydrocarbon resins" or "petroleum hydrocarbon resins". These include also pure monomer aromatic resins, which are made by polymerizing aromatic monomer feedstocks that have been purified to eliminate color causing contaminants and to precisely control the composition of the product. Hydrocarbon resins typically have a relatively low number average molecular weight ($M_n$), such in the range of 250-5000 g/mol, and a glass transition temperature, determined by dynamical mechanical analysis (DMA) as the peak of the measured loss modulus (G") curve using an applied frequency of 1 Hz and a strain level of 0.1%, of above 0° C., preferably equal to or higher than 15° C., more preferably equal to or higher than 30° C.

Examples of suitable hydrocarbon resins include C5 aliphatic hydrocarbon resins, mixed C5/C9 aliphatic/aromatic hydrocarbon resins, aromatic modified C5 aliphatic hydrocarbon resins, cycloaliphatic hydrocarbon resins, mixed C5 aliphatic/cycloaliphatic hydrocarbon resins, mixed C9 aromatic/cycloaliphatic hydrocarbon resins, mixed C5 aliphatic/cycloaliphatic/C9 aromatic hydrocarbon resins, aromatic modified cycloaliphatic hydrocarbon resins, C9 aromatic hydrocarbon resins, polyterpene resins, and copolymers and terpolymers of natural terpenes as well hydrogenated versions of the aforementioned hydrocarbon resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Suitable hydrocarbon resins are commercially available, for example, under the trade name of Wingtack® series, Wingtack® Plus, Wingtack® Extra, and Wingtack® STS (all from Cray Valley); under the trade name of Escorez®1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RÜTGERS Novares GmbH); and under the trade name of Kristalex®, Plastolyn®, Piccotex®, Piccolastic® and Endex® (all from Eastman Chemicals).

The first component A may further contain one or more additives, such as biocides, particulate flame retardants, inorganic or organic fibers, thickeners, anti-foaming agents, pigments, and dyes, which are commonly known to a skilled person in the field of aqueous polymer dispersions.

The first component A can be prepared by mixing the constituents together, preferably at normal room temperature, using any suitable mixing apparatus, such as dissolver discs, blades, or other similar apparatus.

The second component B of the two-component composition of the present invention comprises:
  b1) A mineral binder composition C comprising at least one hydraulic binder H.

The purpose of the mineral binder composition C is to perform as a drying agent, which is able to absorb at least a portion of the water contained in the first component A after the second component B has been mixed with the first component A. It has been surprisingly found out that the use of mineral binder compositions as a drying agent enables faster drying and curing of the two-component composition even at subzero temperatures. Furthermore, the mineral binder-based drying agent has been found out to have only a small impact on the mechanical properties of the cured composition.

According to one or more embodiments, the mineral binder composition C comprises at least 50 wt.-%, preferably at least 65 wt.-%, more preferably at least 75 wt.-%, even more preferably at least 85 wt.-%, of the total weight of the second component B.

The mineral binder composition C comprises at least one hydraulic binder H.

The term "hydraulic binder" refers the present document an inorganic material or blend, which forms a paste when mixed with water, and which sets and hardens by a series of hydration reactions resulting in formation of solid mineral hydrates or hydrate phases, which are not soluble in water or have a very low water-solubility. Hydraulic binders, such as Portland cement, can harden and retain their strength even when exposed to water, for example underwater or under high humidity conditions. In contrast, the term "non-hydraulic binder" refers to substances, which harden by reaction with carbon dioxide and which, therefore, do not harden in wet conditions or under water.

Preferred hydraulic binders H include Portland cement, aluminate cement, and calcium sulfoaluminate cement.

The term "Portland cement" as used herein is intended to include those cements normally understood to be "Portland cements", particularly those described in European Standard EN-197. Portland cement consists mainly of tri-calcium silicate (alite) ($C_3S$) and dicalcium silicate (belite) ($C_2S$). Preferred Portland cements include the types CEM I, CEM II, CEM III, CEM IV, and CEM V compositions of the European standard EN 197-1:2018-11. However, all other Portland cements that are produced according to another standard, for example, according to ASTM standard, British (BSI) standard, Indian standard, or Chinese standard are also suitable.

The term "aluminate cement" as used herein is intended to include those cementitious materials that contain as the main constituent (phase) hydraulic calcium aluminates, preferably mono calcium aluminate CA ($CaO \cdot Al_2O_3$). Depending on the type of the aluminate cement, other calcium aluminates, such as $CA_2$, $C_3A$, and $C_{12}A_7$, may also be present. Preferred aluminate cements include also other constituents, such as belite ($C_2S$), alite ($C_3S$), ferrites ($C_2F$, $C_2AF$, $C_4AF$), and ternesite ($C_5S_2\bar{S}$). Some aluminate cements also contain calcium carbonate.

Most preferred aluminate cements for use as the at least one hydraulic binder H include calcium aluminate cements (CAC), which fulfill the requirements of the norm EN 4647 ("Calcium Aluminate Cement"). Suitable calcium aluminate cements are commercially available, for example, from Imerys Aluminates and Royal White Cement.

The term "calcium sulfoaluminate cement (CSA)" is intended to include those cementitious materials that contain as the main constituent (phase) $C4(A3-xFx)3\bar{S}$ ($4CaO \cdot 3-x\ Al_2O_3 \cdot x\ Fe2O3 \cdot CaSO4$), wherein x has a value of 0, 1, 2, or 3. Typically, calcium sulfoaluminate cements also include other constituents, such as aluminates (CA, $C_3A$, $C_{12}A_7$), belite ($C_2S$), ferrites ($C_2F$, $C_2AF$, $C_4AF$), ternesite ($C_5S_2\bar{S}$), and calcium sulfate. Preferred calcium sulfoaluminate cements for use as the at least one hydraulic binder H contain 20-80 wt.-% of ye'elimite (C4A3$\bar{S}$), 0-10 wt.-% of calcium aluminate (CA), 0-70 wt.-% of belite ($C_2S$), 0-35 wt.-% of ferrite, preferably tetracalcium aluminoferrite ($C_4AF$), and 0-20 wt.-% of ternesite (C5S2$\bar{S}$), based on the total weight of the calcium sulfoaluminate cement. Suitable calcium aluminate cements (CAS) are commercially available, for example, from Heidelberg Cement AG, Vicat SA, and Caltra B.V.

According to one or more embodiments, the at least one hydraulic binder H is selected from the group consisting of Portland cement, calcium aluminate cement (CAC), and calcium sulfoaluminate cement (CSA).

Preferably, the at least one hydraulic binder H comprises at least 50 wt.-%, more preferably at least 60 wt.-%, even more preferably at least 75 wt.-%, of the total weight of the mineral binder composition C.

According to one or more preferred embodiments, the at least one hydraulic binder H comprises a first hydraulic binder H1, preferably Portland cement, and a second hydraulic binder H2 different from the first hydraulic binder H1, preferably calcium aluminate cement (CAC) or calcium sulfoaluminate cement (CSA), more preferably calcium aluminate cement (CAC).

According to one or more embodiments, the weight ratio of the amount of the first hydraulic binder H1 to the amount of the second hydraulic binder H2 is in the range of 1:20 to 1:1, preferably 1:15 to 1:3, more preferably 1:15 to 1:5.

According to one or more embodiments, the mineral binder composition C further comprises at least one non-hydraulic binder NH, preferably calcium sulfate.

Examples of suitable non-hydraulic binders include air-slaked lime (non-hydraulic lime) and calcium sulfate. The term "calcium sulfate" is understood to include calcium sulfate anhydride ($CaSO_4$), calcium sulfate hemihydrate ($CaSO_4.\frac{1}{2}H_2O$), and calcium sulfate dihydrate ($CaSO_4.2H_2O$). Furthermore, the term "calcium sulfate hemihydrate" is understood to include both alpha and beta calcium sulfate hemihydrates. Preferred calcium sulfates include the ones derived from REA gypsum, phosphor gypsum, and nature gypsum. The term "REA gypsum" refers here to a gypsum obtained in so-called flue gas desulphurization plants.

According to one or more embodiments, the at least one non-hydraulic binder NH comprises 0.5-35 wt.-%, preferably 1-25 wt.-%, more preferably 5-20 wt.-%, of the total weight of the mineral binder composition C.

According to one or more embodiments, the second component B further comprises at least one cement hydration retarder R.

Suitable cement hydration retarders R include, for example, hydroxycarboxylic acids and their salts, lignosulfonates, phosphonates, sugars in particular saccharides, phosphates, borates, salts of lead, zinc, copper, arsenic, and antimony, alcohols such as ethanol, gluconic acid d-lactone, nitrilo-tris(methylene)phosphonic acid, and pentasodium diethylenetriaminetetraacetate.

According to one or more embodiments, the at least one cement hydration retarder R is selected from the group consisting of tartaric acid, alkali and earth alkali metal salts of tartaric acid, citric acid, alkali and earth alkali metal salts of citric acid, and alkali metal and earth alkali metal salts of orthophosphoric acid, preferably from the group consisting of tartaric acid, sodium tartrate, citric acid, sodium citrate, potassium dihydrogen phosphate, dipotassium hydrogen phosphate, and potassium phosphate.

According to one or more embodiments, the at least one cement hydration retarder R comprises 0.05-1.5 wt.-%, preferably 0.1-1 wt.-%, more preferably 0.15-0.5 wt.-%, of the total weight of the second component B.

According to one or more embodiments, the second component B further comprises at least one re-dispersible polymer powder RP. Suitable re-dispersible polymer powders to be used in the second component B include the ones presented above as suitable for providing the aqueous dispersion of at least one polymer P.

According to one or more embodiments, the at least one re-dispersible polymer powder RP comprises 0.5-30 wt.-%, preferably 1.5-25 wt.-%, more preferably 2.5-20 wt.-%, even more preferably 5-15 wt.-%, of the total weight of the second component B.

According to one or more embodiments, the at least one re-dispersible polymer powder RP comprises at least one polymer selected from the group consisting of acrylic polymers, styrene butadiene copolymers, polyurethane polymers, and ethylene vinyl acetate copolymers.

According to one or more embodiments, the at least one re-dispersible polymer powder RP comprises at least one first polymer RP1 and at least one second polymer RP2 different from the at least one first polymer RP1, wherein the at least one polymer RP1 and the at least one polymer RP2 are selected from the group consisting of acrylic polymers, styrene butadiene copolymers, polyurethane polymers, and ethylene vinyl acetate copolymers.

Preferably, taking into account the individual amounts preferred for the constituents of the first component A and the second component B, the weight ratio of A to B is in the range of 5:1 to 1:2, preferably 3:1 to 1:1.5, more preferably 2.5.1 to 1:1.2, even more preferably 2:1 to 1:1.

The mixed composition obtained by mixing the first component A with the second component B has a pot-life at normal room temperature of 10-180 min, preferably 15-120 min, more preferably 20-100 min, during which application of the composition has to be performed. The pot-life depends mainly on the amount of the second component B, on the type and amount of the at least one hydraulic binder H as well as on the type and amount of the cement hardening retarder R. After a time period corresponding to the pot life, the hardening reactions of the hydraulic binder H makes a subsequent application difficult or even impossible.

The two-component composition of the present invention is especially suitable for adhesive bonding, sealing, or a coating of various substrates including substrates of wood, plastics, such as polyolefins and polyvinylchloride, rubbers, metal, mineral substrates such as plaster flooring, natural stone, and concrete.

Another subject of the present invention is a method for producing a two-component composition according to the present invention, the method comprising steps of:
I) Providing an electrolyte stable aqueous dispersion of at least one polymer P,
II) Mixing the at least one liquid organic freeze point depressant D and the at least one metal salt M, optionally diluted with water, into the electrolyte stable aqueous dispersion of at least one polymer P to form the first component A,
III) Packing the first component A into a first package,
IV) Mixing the ingredients of the mineral binder composition C with each other and optionally with the at least one cement hydration retarder R to form the second component B, and
V) Packing the second component B into a second package.

Suitable packages for storing of components A and B include all conventional packages, such as drums, a pouches or cartridges, which enable storing of a composition for a period of several months up to one year or more, without showing any service-relevant change in the application properties and/or reactivity of the stored composition.

Another subject of the present invention is use of the two-component composition of the present invention as an adhesive, sealant or coating.

The use preferably comprises steps of mixing the first component A and second component B into a homogeneously mixed mixture followed by application of the homogeneously mixed mixture to a surface of one or more substrates. Any static or dynamic mixing device or method can be used, as long as a macroscopically homogeneously mixed mixture can be obtained.

Preferably, the amounts of the first component A and second component B are selected such that the weight ratio of A to B in the mixed composition is in the range of 5:1 to 1:2, preferably 3:1 to 1:1.5, more preferably 2.5.1 to 1:1.2, even more preferably 2:1 to 1:1.

Another subject of the present invention is a method for bonding a first substrate to a second substrate, the method comprising steps of:
i) Proving a two-component composition of the present invention and mixing the first component A and the second component B with each other to obtain a wet adhesive composition,
ii) Applying the wet adhesive composition to a surface of the first substrate to form a first wet adhesive film or bead and/or to a surface of the second substrate to form a second wet adhesive film or bead,
iii) Optionally exposing the first and/or second wet adhesive film(s) or bead(s) to air to form partially dried first and/or second wet adhesive film(s) or bead(s),
iv) Joining the first substrate with the second substrate such that the first wet or partially dried adhesive film or bead is contacted with a surface of second substrate or with the second wet or partially dried adhesive film or bead or such that the second wet or partially dried adhesive film is contacted with a surface of the first substrate, to effect adhesive bonding between the first and second substrates.

The wet adhesive composition may be applied on a surface of a substrate by using any conventional means such as by using conventional rollers, power rollers, brushes, drop spreaders, squeegee, or a toothed trowel.

Preferably, the weight ratio of the amounts first component A to the second component B that are mixed in step i) is in the range of 5:1 to 1:2, preferably 3:1 to 1:1.5, more preferably 2.5.1 to 1:1.2, even more preferably 2:1 to 1:1.

According to one or more embodiments, the first substrate is a roofing membrane, preferably a polyvinylchloride (PVC) or a thermoplastic polyolefin (TPO) membrane, and the second substrate is one of a polyisocyanurate (PIR) insulation board, expanded polystyrene (EPS or XPS) insulation board, wood panel, gypsum cover board, concrete or metal deck, or a roofing membrane, preferably a polyvinylchloride (PVC) or thermoplastic polyolefin (TPO) membrane.

According to one or more embodiments, the wet adhesive composition is applied to the surface of the first and/or second substrate with a wet coating weight of 100-1000 g/m², preferably 150-850 g/m², more preferably 200-650 g/m², even more preferably 250-500 g/m². The term "wet coating weight" refers in the present document to coating weight per unit area of the wet adhesive film or bead before significant evaporation and/or adsorption of water has taken place. Wet coating weights in the above cited ranges have been found out to enable sufficient adhesive bond strengths between the first and second substrates, which are typically required in fully-adhered roof systems.

Still another subject of the present invention is a method for sealing a joint between a first substrate and a second substrate, the method comprising steps of:
I) Proving a two-component composition of the present invention and mixing the first component A and the second component B with each other to obtain a wet sealant composition,
II) Applying the wet sealant composition into the joint to bridge the gap between the first and second substrates,
III) Letting the applied wet sealant mass to cure.

Preferably, the weight ratio of the amounts first component A to the second component B that are mixed in step 1) is in the range of 5:1 to 1:2, preferably 3:1 to 1:1.5, more preferably 2.5.1 to 1:1.2, even more preferably 2:1 to 1:1.

Still another subject of the present invention is an adhered roof system comprising a roof substrate and a roofing membrane having first and second primary exterior surfaces, wherein at least a portion of the second primary exterior surface of the roofing membrane is adhesively adhered to a surface of the roof substrate using the two-component composition of the present invention.

The expression "adhesively adhered using the two-component composition" is understood to mean that at least a portion of the second primary exterior surface of the roofing membrane is directly adhered to the surface of the roof substrate via an adhesive layer formed by using the two-component composition. The expression "directly adhered via an adhesive layer" is understood to mean in the context of the present document that no further layer than the adhesive layer is present between the second primary exterior surface of the roofing membrane and the surface of the roof substrate.

According to one or more embodiments, at least 75%, preferably at least 85%, most preferably at least 90%, of the area of the second primary exterior surface of the roofing membrane is directly adhered to the surface of the roof substrate via an adhesive layer formed by using the two-component composition. According to one or more preferred embodiments, substantially entire area of one of the second primary exterior surface of the roofing membrane is directly adhered to the surface of the roof substrate via an adhesive layer formed by using the two-component composition. The wording "substantially entire area" is understood to mean at least 95%, preferably at least 97.5%, more preferably at least 98.5% of the entire area.

EXAMPLES

The followings compounds and products shown in Table 1 were used in the examples:

TABLE 1

| | |
|---|---|
| Aqueous dispersion of polymer P | Aqueous acrylic copolymer dispersion, solids content 55%, $T_g$ −35° C. |
| Metal salt M | Sodium gluconate |
| Liquid organic freeze point depressant DP | Glycerol |
| Inorganic filler F | Calcium carbonate, $d_{50}$ particle size 15 µm |
| NaOH | Sodium hydroxide, 10 wt.-% solution |
| Dispersing agent DA | Sodium salt of polyacrylic acid |
| Plasticizer PL | Diisononyl cyclohexane |

TABLE 1-continued

| Coalescent agent CA | Butyl diglycol acetate |
|---|---|
| Biocides | Benzylisothiazolinone, 10% emulsion |

Tested Compositions

The constituents and their amounts contained in the first component A and the second component B of the tested two-component composition are shown in Tables 2 and 3, respectively.

The component A was prepared using a lab mixer according to the following procedure:
 i) Premixing of the metal salt M in a small amount of water
 ii) Addition of the other constituents (except the metal salt solution) to the aqueous dispersion of at least one polymer P;
 iii) Mixing until a homogeneously mixed mixture was obtained,
 iv) Addition of the metal salt solution to the mixture obtained from step iii) under continuous mixing,
 v) Continuing mixing until a homogeneously mixed mixture was obtained,
 iii) Filling the mixture obtained in step v) into a pail.

The component B was prepared by dosing the raw materials in a ploughshare mixer and mixing until homogenously mixed mixture was obtained. The prepared mixture was filled into a paper bag.

Application and Film Formation

The first component A (dispersion) and the second component B (powder) were weighted and stored at temperature of −10° C. for 12 hours. After the storage period, the components were mixed with each other at a temperature of −10° C. using a weight ratio A:B of 2:1.

The mixed composition was applied on a surface of a substrate using a toothed trowel and a brush. In both cases, the viscosity of the mixed composition was low enough to provide good applicability. On the next day the adhesive showed full film formation, as judged by optical and haptic appearance.

Freeze-Thaw Stability

Freeze-thaw stability was tested by repeated freezing and thawing of the first component A to form a film. After ten cycles between −40° C. and 50° C., storing the composition minimum for three hours at the respective temperature, no coagulation was observed, and a proper film formation was still given. Furthermore, the dried film was found to be highly stretchable.

Freeze Point

The freezing point of the first component A was determined by means of differential scanning calorimetry (DSC) using a sample mass of 10 mg, a nitrogen purge gas flow of 20 mL/min and the following temperature program:
 Heat from 20 to 200° C. by 10° C./min
 Cool to −20° C. by 20° C./min
 Isotherm at −20° C. for 5 min
 Heat from −20 to 200° C. by 10° C./min
 Cool to 20° C. by 20° C./min According to the DSC measurements, the first component A had a freezing point of −26° C.

Adhesive Properties

The adhesive properties of the inventive and reference compositions were tested by measuring the peel resistances of test specimens obtained by using the tested compositions. The test specimens were composed of a substrate and a PVC membrane bonded to the surface of the substrate using the tested (adhesive) compositions.

The following membranes and reference adhesive composition were used in the peel strength measurements:
 Sarnafil G 410-15; PVC roofing membrane (from Sika Schweiz AG).
 Schönox AB 30/AB 10; Polyethylene-based waterproofing membrane with fleece laminated on both sides (from Sika Deutschland GmbH).
 Sarnacol 2121; water-based roofing adhesive (from Sika Schweiz AG).

The first component A and the second component B of the tested compositions and all other materials used in the measurements were conditioned in a freezer for a minimum 12 hours at a temperature of −10° C. Test specimen were prepared and tested according to EN ISO 22631:2019 standard ("peel strength measurement").

The tested composition was first applied using a suitable trowel to the surface of the substrate (fiber cement, ply wood, or gypsum) to form a wet adhesive layer having a coating weight of 350±50 g/m$^2$. Sample strips having dimensions of 5 cm (width)×20 cm (length)×2 mm (thickness) cut from the PVC membrane were then contacted with the wet adhesive layer and pressed against it by using a standardized 2 kg roller. All test specimen were prepared by the "wet lay-in" method, where the sample strips were directly placed on the wet adhesive layers immediately after application, i.e. without airing of the adhesive layer. After preparation, the thus obtained test specimens were stored for 7 or 14 days at normal room temperature or at a temperature of −10° C. before measuring of the peel strengths.

After the storage, the peel force during peeling of the membrane strips from the surface of the substrate at a peeling angle of 90° were determined using a spring scale. The peeling of the membrane strip was continued until the strip was completely detached from the surface of the substrate. The representative peel resistance was calculated as peel force per unit width of the membrane strip [N/50 mm] measured when half of the membrane strip had been peeled off. The values for "peel resistance" for a tested composition as shown in Table 4 have been determined as an average of five measurements conducted with the same test specimen.

TABLE 2

| First component A | |
|---|---|
| Constituent | [wt.-%] |
| Aqueous dispersion of polymer P (55 wt.-% solids) | 66 |
| Metal salt M | 3.5 |
| Liquid organic freeze point depressant DP | 3 |
| Filler F | 13.2 |
| Added water | 4.2 |
| NaOH | 3 |
| Dispersing agent DA | 0.4 |
| Plasticizer PL | 5 |
| Coalescent agent CA | 1.5 |
| Biocides | 0.2 |
| Total | 100 |

TABLE 3

| Second component B | |
|---|---|
| Constituent | [wt.-%] |
| Hydraulic binder H1 | 6.9 |
| Hydraulic binder H2 | 82.35 |

TABLE 3-continued

| Second component B | |
|---|---|
| Constituent | [wt.-%] |
| Non-hydraulic binder NH | 10.5 |
| Cement hardening retarder R | 0.250 |
| Total | 100 |

TABLE 4

Adhesive properties

| Test specimen | Ex-1 | Ex-2 | [a]Ref-1 | Ex-3 | [b]Ref-2 | [a]Ref-3 | Ex-4 | Ex-5 |
|---|---|---|---|---|---|---|---|---|
| Mixing ratio A:B | 2:1 | 2:1.2 | n/a | 2:1 | 2:0 | n/a | 2:1 | 2:1.2 |
| Membrane | Sarnafil G 410-15 | | | Sarnafil G 410-15 | | | Schönox AB 30/AB 10 | |
| Substrate | Fiber cement board | | | Ply wood board | | | Gypsum board | |
| Peel resistance 7 d @RT [N/50 mm] | 44 | 38 | 36 | 43 | 47 | 27 | — | — |
| Peel resistance 7 d @ −10° C. [N/50 mm] | 49 | 32 | n/a | 32 | *5 | n/a | 9 | 12 |
| Peel resistance 14 d @ −10° C. [N/50 mm] | — | — | — | — | — | — | 24 | 30 |

[a]Sarnacol 2121
[b]Without 2nd component B
*Adhesive was still moist
n/a = not measurable

The invention claimed is:

1. A two-component composition comprising:
   a first component A comprising:
   a1) an aqueous dispersion of at least one polymer P,
   a2) at least one metal salt M, and
   a3) at least one liquid organic freeze point depressant D, wherein the liquid organic freeze point depressant D is a polyhydric alcohol selected from the group consisting of erythritol and pentaerythritol, and
   a second component B comprising:
   b1) a mineral binder composition C comprising at least one hydraulic binder H and
   b2) optionally at least one cement hydration retarder R,
   wherein the at least one liquid organic freeze point depressant D comprises 0.5-4.5 wt. % of the total weight of the first component A.

2. The two-component composition according to claim 1, wherein both components A and B are prepared and stored separately and mixed just before the application of the two-component composition.

3. The two-component composition according to claim 1, wherein the second component B is in form of a powder.

4. The two-component composition according to claim 1, wherein the aqueous dispersion of at least one polymer P is an electrolyte stable aqueous dispersion.

5. The two-component composition according to claim 1, wherein the aqueous dispersion of at least one polymer P comprises at least 25 wt.-%, of the total weight of the first component A.

6. The two-component composition according to claim 1, wherein the at least one polymer P has a glass transition temperature determined by dynamical mechanical analysis (DMA) as the peak of the measured loss modulus (G") curve using an applied frequency of 1 Hz and a strain level of 0.1% of at or below 0° C.

7. The two-component composition according to claim 1, wherein the at least one metal salt M is a monovalent salt having a cation selected from the group consisting of sodium, potassium, and lithium, and/or an anion selected from the group consisting of chloride, formiate, and gluconate.

8. The two-component composition according to claim 1, wherein the at least one metal salt M comprises 0.5-7.5 wt.-%, of the total weight of the first component A.

9. The two-component composition according to claim 1, wherein the at least one liquid organic freeze point depressant D comprises 0.5-4.0 wt. %, of the total weight of the first component A.

10. The two-component composition according to claim 1, wherein the mineral binder composition C comprises at least 50 wt.-%, of the total weight of the second component B.

11. The two-component composition according to claim 1, wherein the at least one hydraulic binder H comprises at least 50 wt.-%, of the total weight of the mineral binder composition C.

12. The two-component composition according to claim 1, wherein the at least one hydraulic binder H is selected from the group consisting of Portland cement, calcium aluminate cement (CAC), and calcium sulfoaluminate cement (CSA).

13. The two-component composition according to claim 1, wherein the at least one cement hydration retarder R is selected from the group consisting of tartaric acid, alkali and earth alkali metal salts of tartaric acid, citric acid, alkali and earth alkali metal salts of citric acid, and alkali metal and earth alkali metal salts of orthophosphoric acid.

14. The two-component composition according to claim 1, wherein the weight ratio of A to B is in the range of 5:1 to 1:2.

15. A method of using the two-component composition according to claim 1 comprising applying the two-component composition as an adhesive, sealant or coating.

* * * * *